(No Model.)
A. J. WHITCOMB.
LAWN MOWER.
No. 274,239. Patented Mar. 20, 1883.
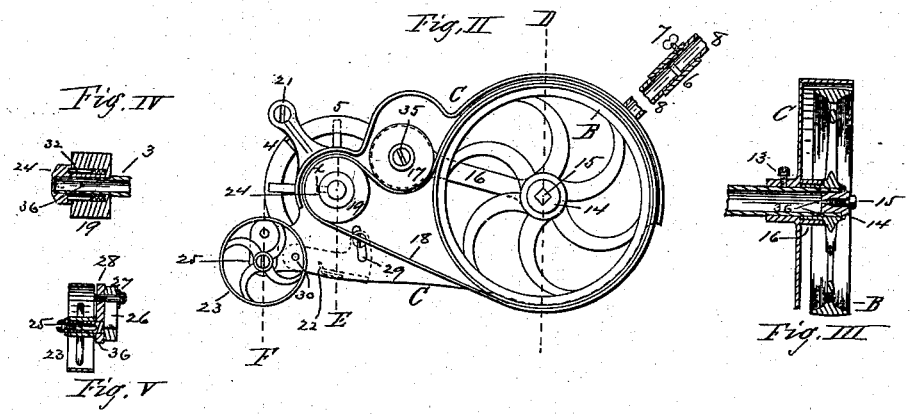
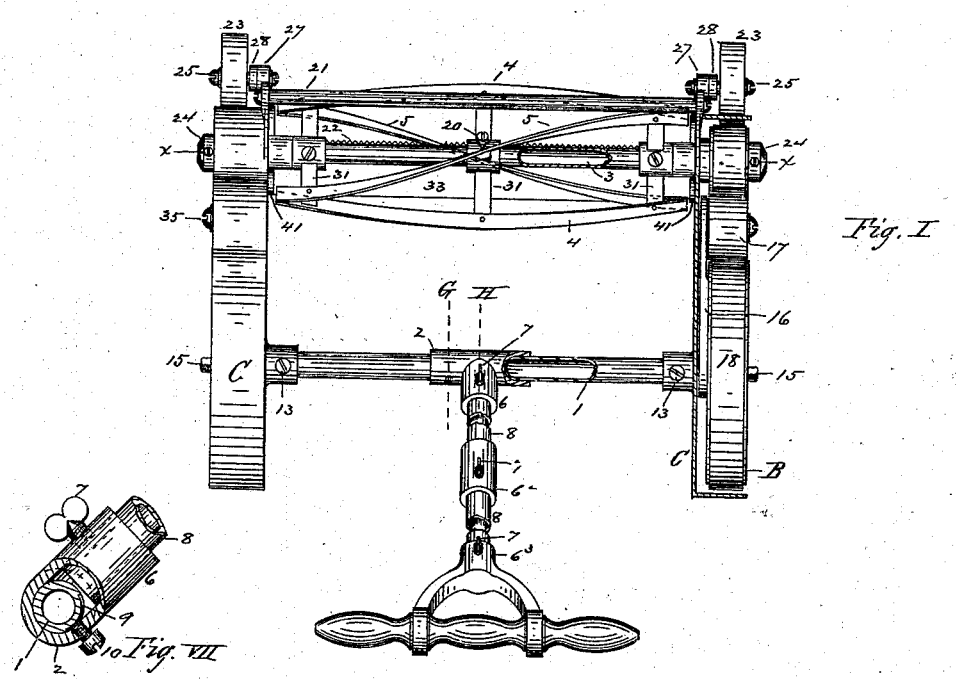
Witnesses.
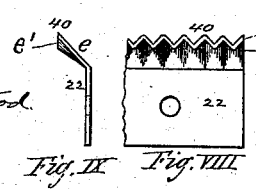
Inventor.
Aaron J. Whitcomb
By T. A. Curtis,
his atty.

UNITED STATES PATENT OFFICE.

AARON J. WHITCOMB, OF CHICOPEE, ASSIGNOR OF ONE-THIRD TO ADALINE W. ANDERTON, OF CHICOPEE FALLS, MASSACHUSETTS.

LAWN-MOWER.

SPECIFICATION forming part of Letters Patent No. 274,239, dated March 20, 1883.

Application filed August 1, 1881. (No model.)

*To all whom it may concern:*

Be it known that I, AARON J. WHITCOMB, of Chicopee, in the county of Hampden and State of Massachusetts, have invented a new and useful Improvement in Lawn-Mowers, of which the following is a specification and description.

I shall first describe a complete machine embodying my improvements, and will then point out the special portions of the same in which my invention resides.

In the drawings, Figure I is a plan view of a lawn-mowing machine made according to my invention. Fig. II is a side view of the same. Fig. III is a vertical transverse section through one of the supporting-wheels and the end of the axle at line D, Fig. II, showing the means for securing the wheels to the axle. Fig. IV is a transverse section through the band-pulley attached to the revolving cutter at line E, Fig. II, and which contains the ratchet or clutch. Fig. V is a transverse section through one of the front supporting-trucks and its bearing at line F, Fig. II. Fig. VI is a transverse section through the axle at line H, Fig. I, showing the means for connecting the handle therewith. Fig. VII is a transverse section through the axle at line G, Fig. I, showing the apertures for introducing oil into the hollow axle. Fig. VIII is a plan view of a portion of the permanent knife, and Fig. IX is a transverse section of the same.

In the drawings, 1 represents the axle, made hollow of tubular form, to which is secured the frame, as C, the upper part of which extends outward and over the side supporting and actuating wheels B and pulleys 17 and 19, and the band 18 extending around them, and which actuates the revolving knife.

The side supporting-wheels B are placed in position on the ends of the axle 1, which is hollow, and a slotted plug, as 14, with a projecting flange around its outer end, and with a threaded hole made therein, which hole is tapered and smaller at its inner end, is inserted into the end of the axle after the wheel is placed thereon, and a screw or bolt, as 15, tapered at its inner end, is turned into said plug until the tapered inner end of the screw enters the tapered part of the hole in the plug and crowds the slotted inner end of the plug outward and firmly against the inside of the hollow axle 1, and holds the plug firmly therein, and the flange on the outer end of the plug projecting outward around the outer end of the hub of the wheel, the latter is held securely upon the axle, but so as to revolve freely.

The revolving knife may be made by attaching the blades to an ordinary reel or skeleton, as 31, and these may be secured so that these blades may extend in a spiral manner along the reel in both directions, as shown at 4 and 5, the spiral line of each knife or blade 4 extending in an opposite direction to that of each knife 5. The reel or skeleton 31, to which the blades are secured, is attached to a hollow shaft, as 3, which has its bearings at each end in the frame C, so as to revolve freely, said shaft extending through the frame C, with a pulley, as 19, secured on each end outside the frame, so as to revolve freely on said shaft. I secure this pulley to the ends of the shaft by means of a cap, as 24, with a small set-screw, as $x$, turned into a threaded hole in the cap and against the shaft, the inner face of said cap having a series of ratchet-teeth made thereon, with one or more spring-pins, as 32, projecting from a hole in the pulley 19, and a spring inside to cause the pin to engage with the ratchet-teeth, this arrangement forming a clutch or ratchet device to cause the shaft 3 to revolve when the machine is moved in one direction by the driving-belt 18, the pulley 19 revolving loosely upon the shaft when the machine and belt are moved in the opposite direction.

An arm, as 16, is provided with a ring at one end, and encircles the axle 1 just inside each wheel B, and extends forward, with a pulley, as 17, pivoted to its forward end, which pulley may be made sufficiently heavy, and the arm 16 swings freely upon the axle, with the pulley 17 resting upon the band 18, which extends around the driving and supporting wheel B and the pulley 19 on the revolving knife-shaft 3 at each end, so that the weight of this pulley 17 and arm 16 at each end always keeps the band tight on the wheels B and 19, and prevents the band from slipping, and if the band stretches or increases in length the pulley 17 drops down farther between the wheels B and 19 to take up the slack in the band.

The front of the frame C has a piece, as 27, cast thereon, in which is a vertical slot, as 26, (shown in Fig. V,) and a screw is turned through this slot into a piece, as 28, having an outwardly-projecting stud or pin which is hollow, but is closed at it inner end, and upon this pin or stud a small roll, 23, is secured to revolve by a small screw turned into the outer threaded end of the stud. By loosening the screw and moving it up or down in the slot in the part 27 the roll 23 will be adjusted either up or down, and is secured at any desired height by turning in the screw, which adjustment of the roll 23 will control the height at which the grass is cut.

The permanent or fixed knife 22 may consist of a thin flat bar securely bolted to a sufficiently rigid casting, as 33, extending across from one side of the frame to the other, and preferably pivoted at 30 in the frame on each side at the front part of the casting, with a vertical slot in the frame, as at 29, with a screw turned through said slot and into each end of the casting, and the knife-bar secured thereto may be swung upon its pivots 30 into any desired position with reference to the blades 4 and 5 of the revolving knife above, and then secured by said screw. This thin flat bar 22 is made with its front portion turned upward at an inclination to its main flat part, and is corrugated on its front side, so that its extreme edge is serrated, as shown clearly in Figs. I and VIII. The upper side of this serrated front portion of the knife is made substantially flat, as shown at $e$, or of such form that the edge of each blade of the revolving knife will come into contact with the entire length of the upper side of this serrated portion, the cutting portion of this permanent or fixed knife being on its upper side, the front edge of the knife being serrated to hold the grass in its upright position while being cut. By giving this form to the knife the grass, while being cut, is forced into these corrugations at the edge by the revolving cutter, and is held firmly from sliding sidewise while being cut, so that the grass is cut more thoroughly and cleanly than can be done by a stationary knife having a smooth and straight edge.

The hollow axle 1 and shaft 3 and the hollow bearings of the rolls 23 may have cotton waste or some absorbent material placed therein, and then filled with lubricating oil, whence said oil will flow to the bearings through the small holes, as 36, through said shafts, to lubricate the bearings automatically and gradually as fast as it is wanted or required.

A tubular socket, as 6, secured at right angles to a short pipe, as 2, is secured to the axle 1 by a set-screw, as 10, turned through a threaded hole in the pipe 2, and into a circumferential slot, as 9, in the axle, so that the said socket, into which the handle, as 8, may be inserted and secured by a thumb-screw, as 7, may have a swinging movement around the axle to a limited extent, and an aperture, as 11, is made through the axle, and also an aperture, as 12, is made in the pipe 2, so that when the handle is held in a vertical or other desired position these two apertures 11 and 12 will coincide, and the cotton or other absorbent within the axle may be perfectly saturated and the axle filled with oil through said apertures.

The shaft 3 is also provided with a threaded aperture, through which oil may be introduced, and the aperture then stopped by a screw turned therein.

As thus arranged, the lubricating-oil will be supplied to all the bearings automatically, and the frequent oiling of the machine by hand avoided without any undue wearing away or "cutting" of the bearings.

If desired, the handle may be put together in short joints or parts by using one or more short pieces of pipe, as $6^2$, secured at one end to a tubular part, 8, of the handle, and inserting another part of the handle into the opposite end of said pipe $6^2$, and then securing it by a set-screw, as 7.

The frame C is strengthened by a rod, as 21, extending across the front portion of the machine, and secured to the frame at each end, which rod also serves the purpose of a guard to prevent injury to large shrubs by the revolving knife.

It is evident that the hollow axle 1 may be successfully used without the pipe attachment 2 for the handle, and the oil introduced through an aperture stopped by a screw, as in the arrangement of the shaft 3.

I do not wish to limit myself to the use, with this machine, of a revolving knife whose blades extend spirally in opposite directions, inasmuch as a knife whose blades extend spirally only in one direction, used with the same machine, possesses many advantages over other machines now in use and otherwise constructed.

Instead of the pulley 17 being secured to the swinging arm 16 on each side by the screw-bolt, as 35, upon which said pulley revolves, the said arm may be dispensed with, and a slot made in the frame, and the screw-bolt be secured at any desired point in the said slot, thus adjusting the tightening-pulley 17 in a fixed position at any desired height, to bear upon the band and take up its slack as it becomes stretched.

Having thus described my invention, what I claim as new is—

1. The combination, in a lawn-mowing machine, of the hollow axle provided with an oiling-aperture, 11, and a circumferential slot, 9, the socket-pipe 2, provided with the aperture 12 and the set-screw 10, as a means of securing the handle to the axle and of opening and closing the oiling-aperture in the axle, when desired, by the vertical movement of the handle, substantially as described.

2. The combination, in a lawn-mowing machine, of a revolving knife actuated by the driving mechanism, and a fixed knife having a serrated front edge and having a flat cutting portion along the upper side of the serrated part of the blade, substantially as described.

3. The combination, in a lawn-mowing machine, of a shaft adapted to revolve in the frame at each end of the machine, and a series of blades secured to said shaft and extending spirally—one in one direction and the next in the other direction—partially around said shaft, and each blade being continuous for the whole length of the revolving knife, substantially as described.

AARON J. WHITCOMB.

Witnesses:
T. A. CURTIS,
E. M. BISSELL.